United States Patent
Ni et al.

(10) Patent No.: US 10,818,078 B2
(45) Date of Patent: Oct. 27, 2020

(54) RECONSTRUCTION AND DETECTION OF OCCLUDED PORTIONS OF 3D HUMAN BODY MODEL USING DEPTH DATA FROM SINGLE VIEWPOINT

(71) Applicant: SONY CORPORATION, Tokyo (JP)

(72) Inventors: Jie Ni, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 51 days.

(21) Appl. No.: 16/140,907

(22) Filed: Sep. 25, 2018

(65) Prior Publication Data

US 2020/0098166 A1 Mar. 26, 2020

(51) Int. Cl.
*G06T 15/40* (2011.01)
*G06T 19/20* (2011.01)
*G06T 17/20* (2006.01)

(52) U.S. Cl.
CPC ............ *G06T 15/405* (2013.01); *G06T 17/20* (2013.01); *G06T 19/20* (2013.01); *G06T 2219/2016* (2013.01); *G06T 2219/2021* (2013.01)

(58) Field of Classification Search
CPC ........ G06T 19/20; G06T 17/20; G06T 15/405
See application file for complete search history.

(56) References Cited

U.S. PATENT DOCUMENTS

| | | | |
|---|---|---|---|
| 7,961,934 B2 | 6/2011 | Thrun et al. | |
| 9,039,528 B2 | 5/2015 | Geiss | |
| 9,182,814 B2 | 11/2015 | Kipman et al. | |
| 2005/0128197 A1* | 6/2005 | Thrun | G01B 21/20 345/421 |
| 2009/0284529 A1* | 11/2009 | De Aguiar | G06T 13/40 345/420 |
| 2010/0197400 A1* | 8/2010 | Geiss | G06T 13/40 463/32 |
| 2010/0303289 A1* | 12/2010 | Polzin | G06K 9/00342 382/103 |
| 2019/0213778 A1* | 7/2019 | Du | G06T 15/04 |

OTHER PUBLICATIONS

Wu, et al., "Detection and Segmentation of Multiple, Partially Occluded Objects by Grouping, Merging, Assigning Part Detection Responses", 2009, vol. 82, pp. 185-204.
Wu, et al., "Detection and Tracking of Multiple, Partially Occluded Humans by Bayesian Combination of Edgelet based Part Detectors", International Journal of Computer Vision, 2007, 20 pages.

* cited by examiner

*Primary Examiner* — Michael Le
(74) *Attorney, Agent, or Firm* — Chip Law Group

(57) ABSTRACT

A virtual Reality (VR)-based apparatus that includes a depth sensor that captures a plurality of depth values of a first human subject from a single viewpoint and a modeling circuitry that detects a set of visible vertices and a set of occluded vertices from a plurality of vertices of the first 3D human body model rendered on a display screen. The modeling circuitry determines a set of occluded joints and a set of visible joints from a plurality of joints of a skeleton of the first 3D human body model in the rendered state. The modeling circuitry updates a rotation angle and a rotation axis of the determined set of occluded joints to a defined default value in the skeleton and thereafter, re-renders the first 3D human body model as a reconstructed 3D human model of the first human subject on the display screen.

20 Claims, 8 Drawing Sheets

RECONSTRUCTION AND DETECTION OF OCCLUDED PORTIONS OF 3D HUMAN BODY MODEL USING DEPTH DATA FROM SINGLE VIEWPOINT

CROSS-REFERENCE TO RELATED APPLICATIONS/INCORPORATION BY REFERENCE

None.

FIELD

Various embodiments of the disclosure relate to three-dimensional (3D) modeling technologies. More specifically, various embodiments of the disclosure relate to reconstruction and detection of occluded portions of 3D human body model using depth data from a single viewpoint.

BACKGROUND

Advancements in the field of three-dimensional (3D) computer graphics, computer vision, and 3D modeling have provided the ability to create 3D models and visualize objects in a 3D computer graphics environment. Typically, a 3D stereo capture system is utilized to generate a 3D model of a human body. The 3D stereo capture system includes multiple stereo cameras that capture the human body from a plurality of viewpoints. However, such 3D stereo capture systems are expensive and may be undesirable for daily applications. Further, in cases where multiple stereo cameras are not available, a single depth sensor may be used. However, such 3D models generated based on input from either multiple stereo cameras or the single depth sensor, exhibit visual artifacts when rendered on a display, which may not be visually appealing. For example, some regions of the full 3D model of the human body may be occluded during rendering on the display. Therefore, in such cases, the shape of the generated full 3D model of the human body may be inaccurate or erroneous due to the lack of depth values in the occluded portions of the full 3D model. Furthermore, the computation cost of the full 3D model of the human body, in such cases is high, which is undesirable. In certain scenarios, a rough orientation of the human body and a camera's viewpoint or position, may be used to determine a visible surface of the full 3D model. In such cases, self-occlusion, i.e., one body part occluding another body part of a human body during capture of the human body from the camera's viewpoint, may not be taken into account. Therefore, the full 3D model may be erroneous and inaccurate due to self-occlusion among different parts of the human body.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method for reconstruction and detection of occluded portions of three-dimensional (3D) human body model using depth data from single viewpoint is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus for reconstruction and detection of occluded portions of 3D human body model using depth data from single viewpoint. Exemplary aspects of the disclosure provides a VR-based apparatus that includes a depth sensor configured to capture a plurality of depth values of a first human subject from a single viewpoint. The VR-based apparatus may further include a memory device configured to store a first 3D human body model of the first human subject and structural information of a skeleton comprising a plurality of joints of the first 3D human body model. The skeleton may be a digital rig. The VR-based apparatus may further include a modeling circuitry configured to generate a reconstructed 3D human model of the first human subject based on detection of occluded portions of the first 3D human body model.

In contrast to conventional systems, the disclosed VR-based apparatus may detect a plurality of occluded portions of 3D human body model, such as the first 3D human body model. The disclosed VR-based apparatus may utilize a depth buffer to store a current depth value of a vertex of the first 3D human body model, rendered on a pixel of a plurality of pixels of the display screen. The VR-based apparatus may use depth buffering to detect visibility of a plurality of vertices of the first 3D human body model of the first human subject rendered on a display screen. The VR-based apparatus may determine a set of visible joints and a set of occluded joints based on the determined visibility of the plurality of vertices of the first 3D human body model. The utilization of depth buffering for the plurality of vertices of the first 3D human body model increases rendering speed of the first 3D human body model on the display screen. The VR-based apparatus may detect a plurality of occluded portions of the first 3D human body model based on the determined set of occluded joints. A reconstructed 3D human model may be generated based on the detection of the set of occluded joints of the first 3D human body model. The disclosed VR-based apparatus constrains a joint rotation of the set of occluded joints to a default value while rendering the reconstructed first 3D human body model. The reconstructed 3D human model may be a realistic 3D human body model of the first human subject. The disclosed visible apparatus also detects self-occlusion among different body parts of the first 3D human body model. Thus, the disclosed apparatus is capable of reconstructing a full 3D model of the human subject with accuracy by detecting the occluded portions (or parts) of the first 3D human body model.

Figure 1:
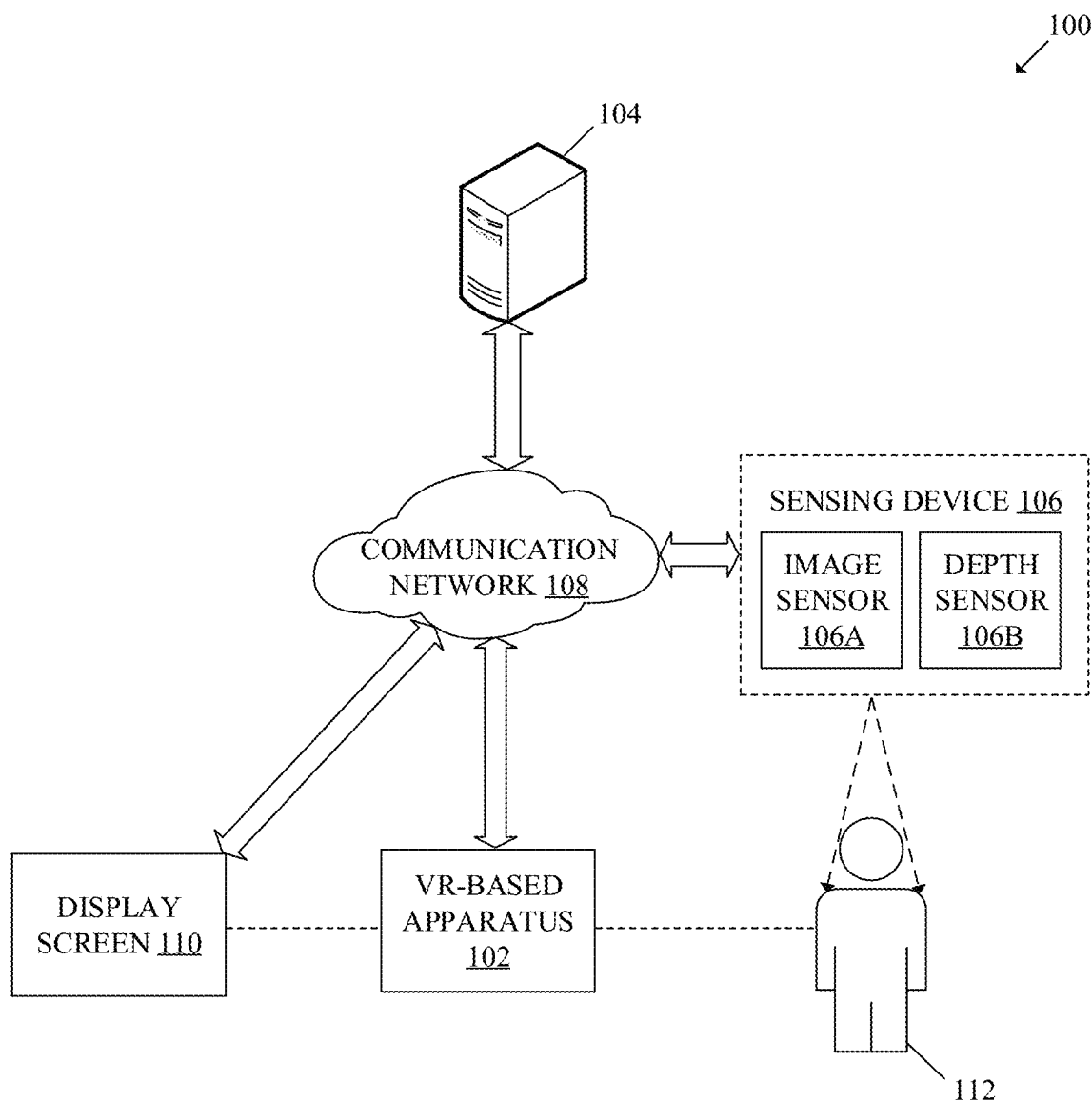
FIG. 1 is a block diagram that illustrates an exemplary network environment for reconstruction and detection of occluded portions of three-dimensional (3D) human body model using depth data from single viewpoint, in accordance with an embodiment of the disclosure.

FIG. 1 is a block diagram that illustrates an exemplary network environment for reconstruction and detection of occluded portions of 3D human body model using depth data from single viewpoint, in accordance with an embodiment of the disclosure. With reference to FIG. 1, there is shown a network environment 100. The network environment 100 may include a Virtual Reality (VR)-based apparatus 102, a server 104, a sensing device 106, a communication network 108, and a display screen 110. The sensing device 106 may include an image sensor 106A and a depth sensor 106B. A first human subject 112, that is to be modeled, may be associated with the VR-based apparatus 102. The VR-based apparatus 102 may be communicatively coupled to the server 104 and the sensing device 106, via the communication network 108. The display screen 110 may be connected to the VR-based apparatus 102. In accordance with an embodiment, the VR-based apparatus 102 may be communicatively coupled to the display screen 110, via the communication network 108.

The VR-based apparatus 102 may comprise suitable logic, circuitry, and interfaces that may be configured to generate a reconstructed 3D human model of the first human subject 112. The VR-based apparatus 102 may be configured to generate the reconstructed 3D human model of the first human subject 112 based on a plurality of depth values of the first human subject 112 captured by the depth sensor 106B from a single viewpoint. Examples of the VR-based apparatus 102 may include, but are not limited to, a computing device, a video-conferencing system, an augmented reality-based device, a gaming device, a mainframe machine, a server, a computer work-station, and/or a consumer electronic (CE) device.

The server 104 may comprise suitable logic, circuitry, and interfaces that may be configured to store a first 3D human body model and structural information of a skeleton (e.g., a rig) comprising a plurality of joints of the first 3D human body model. In some embodiments, the server 104 may be further configured to store the plurality of depth values of the first human subject 112 captured by the depth sensor 106B from the single viewpoint. In some embodiments, the server 104 may be implemented as a cloud server, which may be utilized to execute aforementioned operations of the server 104 through web applications, cloud applications, HTTP requests, repository operations, file transfer, gaming operations, and the like. Other examples of the server include, but are not limited to a database server, a file server, a web server, an application server, a mainframe server, or other types of server.

The sensing device 106 may comprise suitable logic, circuitry, and interfaces that may be configured to capture the plurality of depth values of the first human subject 112 from a single viewpoint. The sensing device 106 may be further configured to capture a plurality of images (or video) of the first human subject 112 from the single viewpoint. The sensing device 106 may be configured to capture the plurality of depth values of the first human subject 112 from the single viewpoint in a real time, near-real time, or a certain lag time. The sensing device 106 may be configured to transmit the captured plurality of depth values and the captured plurality of images of the first human subject 112 to the VR-based apparatus 102, via the communication network 108. The sensing device 106 may include a plurality of sensors, such as a combination of a depth sensor, a color sensor, (such as a red-green-blue (RGB) sensor), and/or an infrared (IR) sensor which may capture the first human subject 112 from the single viewpoint. Examples of the sensing device 106 may include, but are not limited to, the depth sensor, the RGB sensor, the IR sensor, a 3D-mesh structure generator used to move an object, an image sensor, or a motion-detector device.

The communication network 108 may include a communication medium through which the VR-based apparatus 102 may be communicatively coupled to the server 104 and the sensing device 106. In certain embodiments, the display screen 110 may be communicatively coupled to the VR-based apparatus 102 and the server 104, via the communication network 108. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity(Li-Fi), 802.16, IEEE 802.11s, IEEE 802.11g, multi-hop communication, wireless access point (AP), device to device communication, cellular communication protocols, and Bluetooth (BT) communication protocols.

The display screen 110 may comprise suitable logic, circuitry, and/or interfaces that may be configured to render the first 3D human body model on the display screen 110. In accordance with an embodiment, the display screen 110 may be configured to receive input from the first human subject 112. In such a scenario, the display screen 110 may be a touch screen, which may enable the first human subject 112 to provide input. The touch screen may be at least one of a resistive touch screen, a capacitive touch screen, or a thermal touch screen. In accordance with an embodiment, the display screen 110 may receive the input through a virtual keypad, a stylus, a gesture-based input, or a touch-based input. The display screen 110 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 110 may refer to a display screen of a head mounted device (HMD), a smart-glass device, a see-through display, a projection-based display, an electro-chromic display, or a transparent display. In accordance with an embodiment, the display screen 110 may be an internal display screen that may be integrated with the VR-based apparatus 102.

In operation, the image sensor 106A of the sensing device 106 may be configured to capture a plurality of images of the first human subject 112 from a single viewpoint of the sensing device 106. The captured plurality of images may be a plurality of color images of the first human subject 112. The sensing device 106 may further include the depth sensor 106B configured to capture a plurality of depth values of the first human subject 112 from the single viewpoint of the sensing device 106. The captured plurality of depth values may include values of "Z" coordinates of the first human subject 112 in a 3D coordinate system from the single viewpoint of the sensing device 106. The first human subject 112 may be at rest or in motion at an instance of capture of the plurality of images and the plurality of depth values.

In accordance with an embodiment, the VR-based apparatus 102 may receive a first 3D human body model of the first human subject 112. The received first 3D human body model may be rendered on the display screen 110. The first 3D human body model may be a 3D computer graphics model that may represent a physical body, such as the first human subject 112, using a collection of points in a 3D space which are connected by geometric entities, such as polygons. A 3D model, such as the first 3D human body model, may include a plurality of vertices, such that a vertex of the 3D model may be a point where edges of one or more polygons of the 3D model may intersect with each other. The VR-based apparatus 102 may be configured to store the first 3D human body model of the first human subject 112 and structural information of a skeleton comprising the plurality of joints of the first 3D human body model. The skeleton may be a digital rig. Each joint of the plurality of joints in the structural information of the skeleton may be associated with a rigid rotation based on a rotation angle and a rotation axis of each joint of the plurality of joints.

The VR-based apparatus 102 may further include a depth buffer configured to store a plurality of depth buffer values. The depth buffer may be a data buffer that may be used to store temporary depth values at a plurality of pixel positions of the display screen 110. The plurality of depth buffer values may include a depth buffer value for each pixel position of a plurality of pixel positions covered by the first 3D human body model at the rendered state in the display screen 110. The depth buffer value at each pixel position may be a depth value of a vertex of the first 3D human body model that may be visible at that pixel position.

The VR-based apparatus 102 may be configured to detect a set of visible vertices and a set of occluded vertices from a plurality of vertices of the first 3D human body model, at the rendered state of the first 3D human body model on the display screen 110. For example, a first vertex of the plurality of vertices may be detected as a visible vertex or an occluded vertex based on a difference in a depth value of the first vertex rendered at a first pixel position on the display screen 110 and a depth buffer value assigned for the first pixel position. The first vertex of the plurality of vertices may be detected as the visible vertex when the difference in the depth value of the first vertex rendered at the first pixel position on the display screen 110 and the depth buffer value assigned for the first pixel position, may be less than a defined first threshold value. The first vertex of the plurality of vertices may be detected as the occluded vertex when the difference in the depth value of the first vertex rendered at the first pixel position on the display screen 110 and the depth buffer value assigned for the first pixel position, may be greater than the defined first threshold value. The detection of the set of visible vertices and the set of occluded vertices is further shown and described, for example, in FIG. 3B.

In accordance with an embodiment, the VR-based apparatus 102 may be configured to determine a set of occluded joints and a set of visible joints from a plurality of joints of the skeleton of the first 3D human body model in the rendered state. A first joint of the plurality of joints may be detected as a visible joint or an occluded joint based on at least a comparison of a number of visible vertices and a number of occluded vertices, controlled by the first joint. In accordance with an embodiment, the VR-based apparatus 102 may be configured to calculate a visibility score of each joint of the plurality of joints in the rendered state of the first 3D human body model on the display screen 110. The visibility score of each joint may be calculated based on a comparison of the number of visible vertices and the number of the occluded vertices controlled by each joint of the plurality of joints of the skeleton (e.g. rig) of the first 3D human body model.

The visibility score of each joint of the plurality of joints may be calculated further, based on a plurality of blend weights for the plurality of vertices of the rendered first 3D human body model. Each blend weight of the plurality of blend weights may indicate an extent of deformation that is to be exerted on each vertex of the plurality of vertices of the rendered first 3D human body model to represent a pose of the first human subject 112. Alternatively stated, a blend weight for the first vertex may indicate an amount of deformation that may be required to be applied on the first vertex as a result of one or more joints of the plurality of joints for representation of the pose of the first human subject 112. The set of occluded joints and the set of visible joints from the plurality of joints of the first 3D human body model in the rendered state may be determined further based on the calculated visibility score of each joint of the plurality of joints in the rendered state. The first joint of the plurality of joints of the first 3D human body model in the rendered state may be detected as the visible joint when the visibility score of the first joint may be greater than a defined second threshold value. Similarly, the first joint of the plurality of joints of the first 3D human body model in the rendered state may be detected as the occluded joint when the visibility score of the first joint may be less than the defined second threshold value.

In accordance with an embodiment, the VR-based apparatus 102 may be configured to update the rotation angle and the rotation axis of the determined set of occluded joints to a defined default value in the skeleton of the first 3D human body model. Alternatively stated, the rigid rotation of the set of occluded joints of the first 3D human body model, that includes the rotation angle and rotation axis of the set of occluded joints may be set to the defined default value. Additionally, the rotation angle and the rotation axis of the determined set of visible joints of the plurality of joints in the skeleton may be set based on the captured plurality of depth values of the first human subject 112 by the depth sensor 106B. The VR-based apparatus 102 may be configured to detect a plurality of occluded portions of the first 3D human body model based on a combination of the detected set of visible vertices, the detected set of occluded vertices, and the determined set of occluded joints. The plurality of occluded portions of the first 3D human body model may include the set of occluded vertices and the determined set of occluded joints of the first 3D human body model. In some embodiments, a video sequence may be utilized for reconstruction and detection of occluded portions of a 3D human body model (e.g. first 3D human body model). The video sequence may include a plurality of image frames. Therefore, a reconstructed 3D model may be generated based on the plurality of depth values for each image frame of the video sequence and the reconstructed model from a previous frame may be utilized for detection of the set of occluded joints and the set of visible joints.

In accordance with an embodiment, the VR-based apparatus 102 may be configured to re-render the first 3D human body model as a reconstructed 3D human model of the first human subject 112 on the display screen 110. The first 3D human body model may be re-rendered as the reconstructed 3D human model, in accordance with the set rotation angle and the rotation axis of the set of visible joints, and the updated rotation angle and the rotation axis of the set of occluded joints. The VR-based apparatus 102 may be further configured to control deformation of the first 3D human body model during re-render of the first 3D human body model as the reconstructed 3D human model of the first human subject 112 on the display screen 110. The VR-based apparatus 102 may control the deformation such that the reconstructed 3D human model may exhibit a minimum deviation from a current shape and a current pose of the first human subject 112 during capture of the plurality of depth values by the depth sensor 106B from the single viewpoint.

Figure 2:
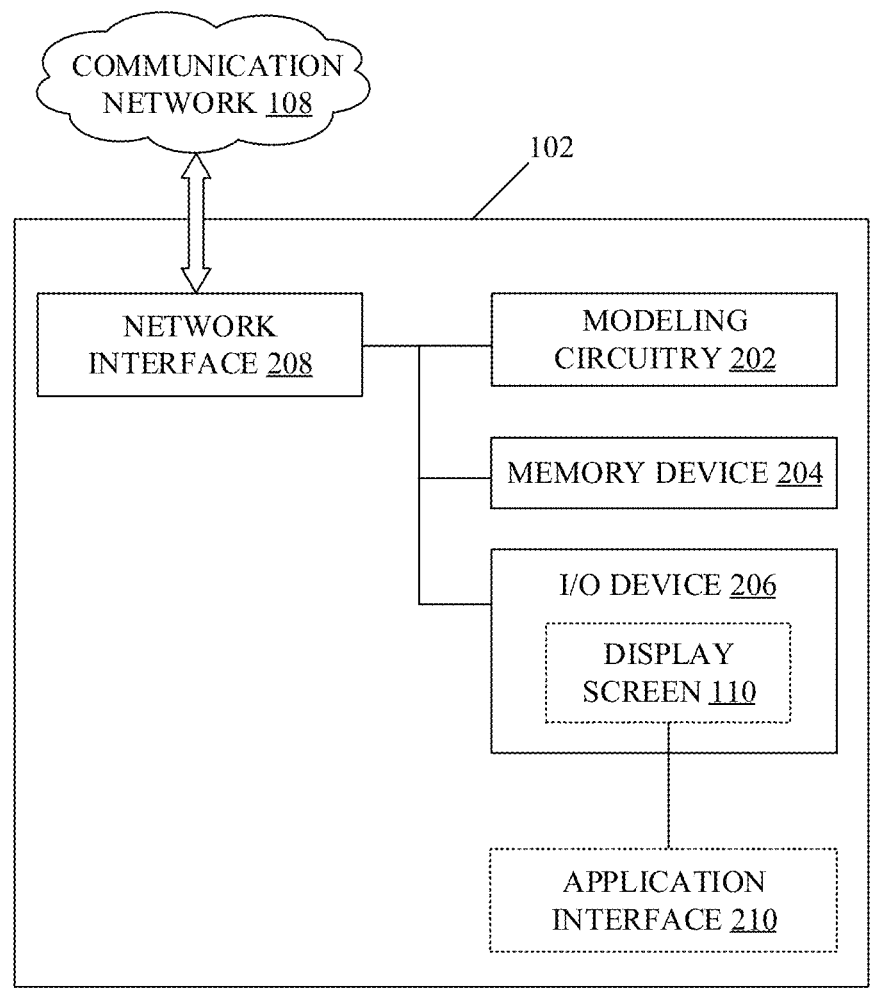
FIG. 2 is a block diagram that illustrates an exemplary VR-based apparatus for reconstruction and detection of occluded portions of 3D human body model using depth data from single viewpoint, in accordance with an embodiment of the disclosure.

FIG. 2 is a block diagram that illustrates an exemplary VR-based apparatus for reconstruction and detection of occluded portions of 3D human body model using depth data from single viewpoint, in accordance with an embodiment of the disclosure. FIG. 2 is explained in conjunction with elements from FIG. 1. With reference to FIG. 2, there is shown the VR-based apparatus 102. The VR-based apparatus 102 may include a modeling circuitry 202, a memory device 204, an input/output (I/O) device 206, and a network interface 208. The I/O device 206 may include a display screen, such as the display screen 110, which may be utilized to render an application interface 210. The modeling circuitry 202 may be communicatively coupled to the memory device 204 and the I/O device 206. The modeling circuitry 202 may be configured to communicate with the server 104 and the sensing device 106, by use of the network interface 208.

The modeling circuitry 202 may comprise suitable logic, circuitry, and/or interfaces that may be configured to generate the reconstructed 3D human model of the first human subject 112, based on detection of the plurality of occluded portions of the first 3D human body model of the first human subject 112. The modeling circuitry 202 may include one or more specialized processing units, which may be implemented as a separate processor or circuitry in the VR-based apparatus 102. In an embodiment, the one or more specialized processing units and the modeling circuitry 202 may be implemented as an integrated processor or a cluster of processors that perform the functions of the one or more specialized processing units and the modeling circuitry 202, collectively. The modeling circuitry 202 may be implemented based on a number of processor technologies known in the art. Examples of implementations of the modeling circuitry 202 may be a Graphics Processing Unit (GPU), a Reduced Instruction Set Computing (RISC) processor, an Application-Specific Integrated Circuit (ASIC) processor, a microcontroller, a central processing unit (CPU), or other control circuits.

The memory device 204 may comprise suitable logic, circuitry, and/or interfaces that may be configured to store a set of instructions executable by the modeling circuitry 202. The memory device 204 may be configured to store operating systems and associated applications. In accordance with an embodiment, the memory device 204 may be further configured to store the captured plurality of depth values of the first human subject 112 and the captured plurality of images of the first human subject 112 from the single viewpoint. The memory device 204 may be configured to store the first 3D human body model and structural information of the skeleton comprising the plurality of joints of the first 3D human body model of the first human subject 112. The memory device 204 may be further configured to store the generated reconstructed 3D human model of the first human subject 112. Examples of implementation of the memory device 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, and/or interfaces that may be configured to receive an input from the first human subject 112 and provide an output to the first human subject 112 based on received input from the first human subject 112. For example, the I/O device 206 may be utilized to initialize the operation to reconstruct 3D model human body model based on a request from the first human subject 112. The I/O device 206 may include various input and output devices, which may be configured to communicate with the modeling circuitry 202. Examples of the I/O device 206 may include, but are not limited to, a touch screen, a keyboard, a mouse, a joystick, a microphone, a display screen (for example, the display screen 110), and a speaker. In accordance with an embodiment, the I/O device 206 may include the display screen 110.

The network interface 208 may comprise suitable logic, circuitry, and/or interfaces that may be configured to facilitate communication between the VR-based apparatus 102, the server 104, and the sensing device 106, via the communication network 108. The network interface 208 may be implemented by use of various known technologies to support wired or wireless communication of the VR-based apparatus 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may communicate via wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The application interface 210 may correspond to a user interface (UI) rendered on a display screen, such as the display screen 110. The application interface 210 may display the first 3D human body model of the first human subject 112 on the display screen 110. The application interface 210 may further display the reconstructed 3D human model of the first human subject 112 on the display screen 110. The reconstructed 3D human model of the first human subject 112 may be viewed from a plurality of view-points, by use of the application interface 210. An example of the application interface 210 may include, but is not limited to, a graphical user interface (GUI). In some embodiments, the display screen 110 may be an internal display screen integrated with the VR-based apparatus 102.

In operation, VR-based apparatus 102 may be configured to receive the first 3D human body model of the first human subject 112 that may be rendered on the display screen 110. The first 3D human body model of the first human subject 112 may be generated based on several techniques utilized to generate a 3D human body model. In some embodiments, the VR-based apparatus 102 may be configured to generate the first 3D human body model, based on deformation of a mean body shape of a reference 3D human body model in accordance with a plurality of shape parameters and a plurality of pose parameters. To generate the first 3D human body model of the first human subject 112, based on the deformation of a mean body shape of a reference 3D human body model, the VR-based apparatus 102 may be configured to learn the reference 3D human body model from a training dataset. The training dataset may be a 3D model dataset that may include a plurality of representative human body models of different shapes, for example, the Caesar dataset or other representative human 3D computer graphics model dataset, which includes about 4000 representative human body models of different shapes in a neutral pose. The reference 3D human body model may include a mean body shape and a set of body shape variations. The mean body shape may be a neutral body shape of the reference 3D human body model. The set of body shape variations may include a plurality of human body models in different shapes, for example, a tall human body model, a short human body model, a thin human body model, a fat human body model, and the like. The set of body shape variations may represent deviations from the mean body shape of the reference 3D human body model.

The modeling circuitry 202 may be configured to determine a first shape of the first human subject 112 based on the captured plurality of depth values of the first human subject 112 from the single viewpoint. The determined first shape of the first human subject 112 may be represented as a linear combination of the set of body shape variations. The modeling circuitry 202 may be configured to determine the plurality of shape parameters to deform the mean body shape of the reference 3D human body model to the determined first shape of the first human subject 112. The linear coefficients of each body shape variation, for representing the first shape of the first human subject 112 as the linear combination of the set of body shape variations, may be the plurality of shape parameters.

In accordance with an embodiment, the modeling circuitry 202 may be configured to store information of a skeleton (e.g. rig) that includes a plurality of joints of the reference 3D human body model. The modeling circuitry 202 may be configured to compute a plurality of rigid transformation matrices for each joint of the plurality of joints of the stored skeleton information. The plurality of rigid transformation matrices for each joint of the plurality of joints may be computed based on a rotation angle with respect to a rotation axis of a joint of the plurality of joints and a location of the joint of the plurality of joints. The plurality of rigid transformation matrices may be a plurality of transformation matrices that may be utilized for rigid transformation of the mean body shape of the reference 3D human body model based on the pose of the first human subject 112. The modeling circuitry 202 may determine a plurality of pose parameters for the pose of the first human subject 112 based on the computed plurality of rigid transformation matrices. The determination of the plurality of pose parameters may be further based on the rotation angle of each joint of the plurality of joints of the stored skeleton information. The modeling circuitry 202 may be further configured to determine a plurality of blend weights for a plurality of vertices of the mean shape of the reference 3D human body model. Each blend weight of the plurality of blend weights may indicate an extent of deformation that is to be exerted on each vertex of the plurality of vertices of the mean shape of the reference 3D human body model to represent the pose of the first human subject 112. Alternatively stated, a blend weight of the plurality of blend weights for a vertex of the mean shape of the reference 3D human body model may indicate an amount of deformation that may be required to be applied on the vertex as a result of one or more joints of the plurality of joints for representation of the pose of the first human subject. The number of joints that affect the deformation of the vertex of the plurality of vertices of the mean shape of the reference 3D human body model may be one or more than one, based on the pose of the first human subject 112.

In accordance with an embodiment, the modeling circuitry 202 may be configured to deform the mean body shape of the reference 3D human body model based on the plurality of shape parameters, the plurality of pose parameters, and the computed plurality of blend weights. The modeling circuitry 202 may be configured to generate the first 3D human body model for the pose of the first human subject 112 based on the deformation of the plurality of vertices of the mean shape of the reference 3D human body model in accordance with the plurality of shape parameters, the plurality of pose parameters and the computed plurality of blend weights. This is how the first 3D human body model may be generated based on the deformation of the plurality of vertices of the mean shape of the reference 3D human body model in an example.

In accordance with an embodiment, some joints of the plurality of joints of the skeleton of the first 3D human body model may be occluded by other body parts of the first 3D human body model. In such cases, the computed rotation angle and the rotation axis of such joints that may be occluded by other body parts, may be erroneous. Therefore, the modeling circuitry 202 may first render the generated first 3D human body model on a display screen, such as the display screen 110. The modeling circuitry 202 may then detect a set of visible vertices and a set of occluded vertices from the plurality of vertices of the first 3D human body model, at the rendered state. The first vertex of the plurality of vertices of the first 3D human body model may be detected as the visible vertex or the occluded vertex based on the difference in the depth value of the first vertex rendered at the first pixel position on the display screen 110 and the depth buffer value assigned for the first pixel position.

The modeling circuitry 202 may be further configured to determine the set of occluded joints and the set of visible joints from the plurality of joints of the skeleton of the first 3D human body model in the rendered state. The first joint of the plurality of joints may be detected as the visible joint or the occluded joint based on at least a comparison of the number of visible vertices and the number of occluded vertices, controlled by the first joint. In accordance with an embodiment, the modeling circuitry 202 may be configured to calculate the visibility score of each joint of the plurality of joints in the rendered state of the first 3D human body model on the display screen 110. The visibility score of each joint of the plurality of joints may be calculated, based on the plurality of blend weights for the plurality of vertices of the rendered first 3D human body model on the display screen 110. The set of occluded joints and the set of visible joints from the plurality of joints of the first 3D human body model in the rendered state may be determined further based on the calculated visibility score of each joint of the plurality of joints in the rendered state.

The modeling circuitry 202 may be configured to detect the plurality of occluded portions of the first 3D human body model based on the combination of the detected set of visible vertices, the detected set of occluded vertices, and the determined set of occluded joints. The modeling circuitry 202 may update the rotation angle and the rotation axis of the determined set of occluded joints to a defined default value in the skeleton of the first 3D human body model. Additionally, the rotation angle and the rotation axis of the determined set of visible joints of the plurality of joints in the skeleton may be set based on the captured plurality of depth values of the first human subject 112 by the depth sensor 106B. The modeling circuitry 202 may be further configured to re-render the first 3D human body model as a reconstructed 3D human model of the first human subject 112 on the display screen 110. The reconstructed 3D human model of the first human subject 112 may be an accurate 3D model of the first human subject 112, that may be unaffected by the occluded portions of the first 3D human body model.

Figure 3A:
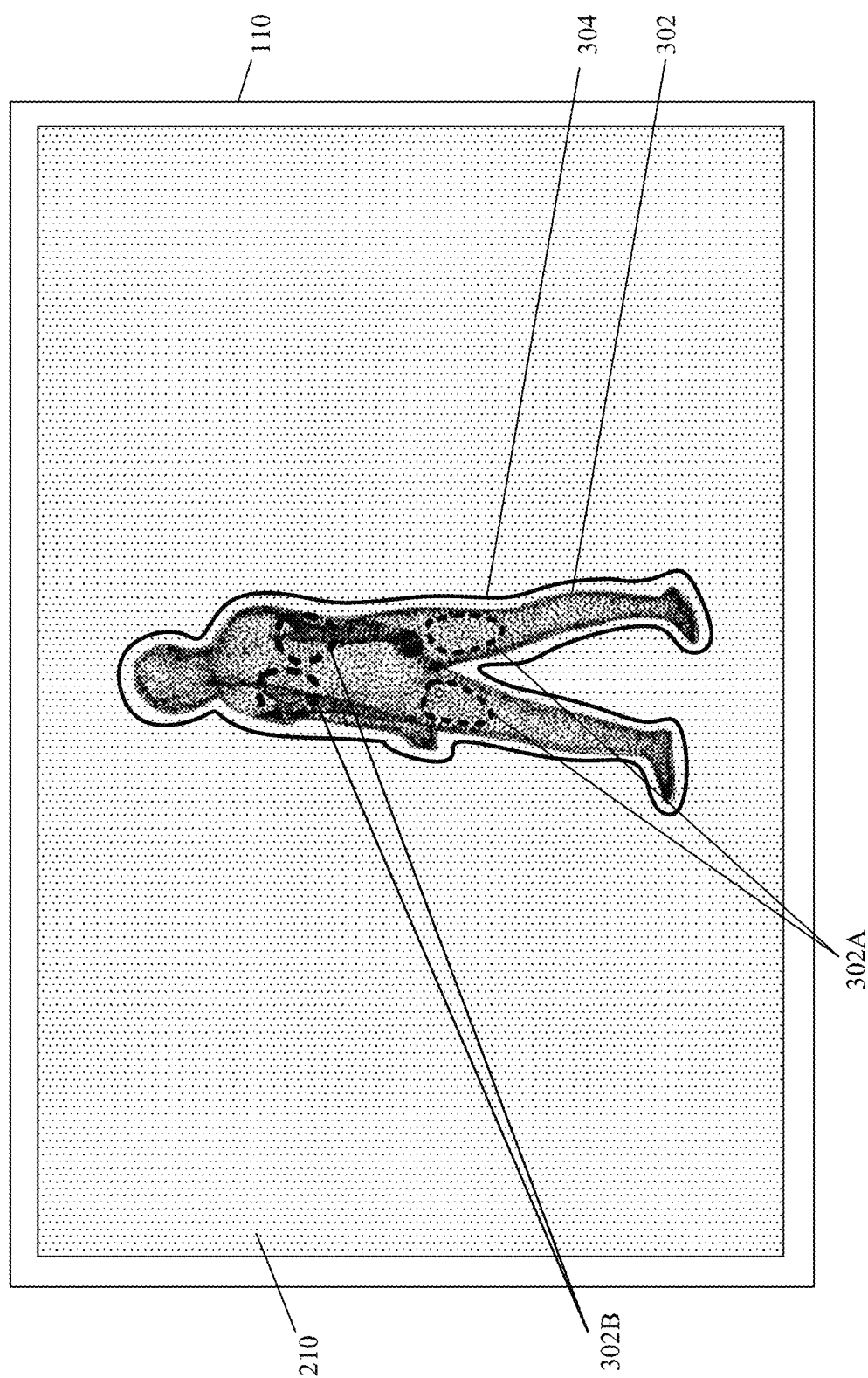
FIGS. 3A, 3B, 3C, and 3D, collectively, illustrate exemplary operations for reconstruction and detection of occluded portions of 3D human body model using depth data from single viewpoint, in accordance with an embodiment of the disclosure.

FIGS. 3A, 3B, 3C, and 3D, collectively, illustrate exemplary operations for reconstruction and detection of occluded portions of 3D human body model using depth data from single viewpoint, in accordance with an embodiment of the disclosure. FIGS. 3A, 3B, 3C, and 3D are explained in conjunction with elements from FIGS. 1 and 2. FIG. 3A illustrates the rendered first 3D human body model on a display screen, in accordance with an embodiment of the disclosure. With reference to FIG. 3A, there is shown a first 3D human body model 302, a display area 304, and the application interface 210 rendered on the display screen 110. There is further shown a set of visible vertices 302A of the first 3D human body model and a set of occluded vertices 302B of the first 3D human body model 302.

In accordance with an embodiment, the modeling circuitry 202 may be configured to render the first 3D human body model 302 on the display screen 110, via the application interface 210. The first 3D human body model 302 may be rendered in a display area, such as the display area 304, of the display screen 110. The first 3D human body model 302 may be rendered on the display screen 110 in real-time or near real-time while the depth values from the depth sensor 106B from a single viewpoint are captured. The first 3D human body model 302 rendered on the display screen 110, may be a 3D computer graphics model that may represent the first human subject 112. The first 3D human body model 302 may be a collection of point in 3D space that may be connected by geometric entities, such as polygons. The first 3D human body model 302 may include a plurality of vertices, where a vertex of the first 3D human body model 302 may be an intersection point of edges of one or more polygons of the first 3D human body model 302. The first 3D human body model 302 may include a set of visible vertices, such as the set of visible vertices 302A and a set of occluded vertices, such as the set of occluded vertices 302B. The first 3D human body model 302 may be a rigged model having a skeleton (e.g. rig) that may include a plurality of joints of the first 3D human body model 302. The first 3D human body model 302 may include a plurality of visible portions and a plurality of occluded portions. The plurality of visible portions of the first 3D human body model 302 may include the set of visible vertices 302A and the set of visible joints. The plurality of occluded portions of the first 3D human body model 302 may include the set of occluded vertices 302B and the set of occluded joints. The set of visible vertices 302A and the set of occluded vertices 302B (of FIG. 3A) are shown as a representation. The plurality of visible portions of the first 3D human body model 302 may be visible to a user (not shown) or the first human subject 112 viewing the display screen 110. The plurality of occluded portions of the first 3D human body model 302 may be occluded by other body portions of the first 3D human body model 302. The first 3D human body model 302 rendered on the display screen 110 may exhibit some visual artifacts due to the plurality of occluded portions present in the first 3D human body model 302. For example, a hand region of the first 3D human body model 302 may occlude some portion of an upper body region of the first 3D human body model 302 of the first human subject 112. Further, the depth values for the occluded portions of the first 3D human body model 302 rendered on the display area 304 of the display screen 110, may be inaccurate.

Figure 3B:
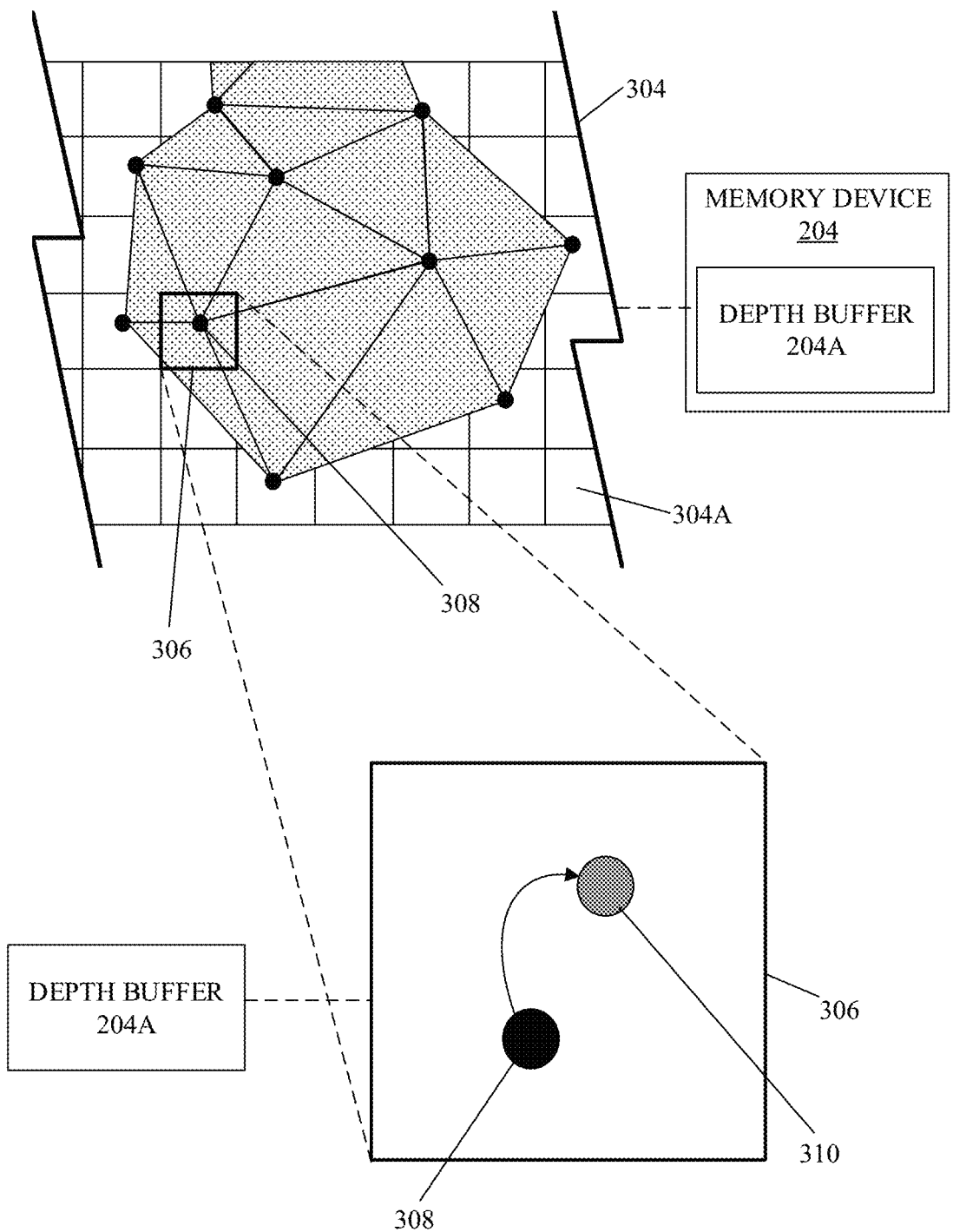

With reference to FIG. 3B, there is shown a portion of the display area 304, a set of pixels 304A, a first pixel 306, a first vertex 308, a second vertex 310, and a depth buffer 204A. The portion of the display area 304 depicts mesh triangles of the first 3D human body model 302 rendered on the display area 304 of the display screen 110 (as shown in FIG. 3A). The portion of the display area 304 also depicts vertices of the mesh triangles of the first 3D human body model 302. The portion of the display area 304 also depicts the set of pixels 304A (represented as squared box) on which the mesh triangles including the vertices of the mesh triangles are rendered. The first vertex 308 corresponds to one of the set of visible vertices 302A (e.g. as shown in 3A). The second vertex 310 corresponds to one of the set of occluded vertices 302B (e.g. as shown in FIG. 3A). The first vertex 308 may be rendered at a first pixel position of the first pixel 306 of the display area 304. The second vertex 310 may not be rendered at the first pixel position of the first pixel 306, and may be occluded. In accordance with an embodiment, number of pixels that display the first vertex 308 on the portion of the display area 304 may be different for different scenarios, based on resolution of the display screen 110.

In accordance with an embodiment, the modeling circuitry 202 may be configured to utilize depth buffering to detect the first vertex 308 and the second vertex 310 as a visible vertex or an occluded vertex. The memory device 204 may include the depth buffer 204A configured to store a plurality of depth buffer values. The depth buffer 204A may be a two-dimensional array that may be configured to store the depth buffer value for each pixel position of the plurality of pixel positions covered by the first 3D human body model 302 at the rendered state in the display area 304 of the display screen 110. For example, a first object may be rendered on the display screen 110 at a pixel position, such as the first pixel position of the first pixel 306. The depth buffer 204A may be configured to store the depth value of the first object as the depth buffer value at the first pixel position. When a second object is rendered at the same pixel position, such as the first pixel position, and the depth value of the second object is less than the stored depth buffer value in the depth buffer 204A, then the depth buffer 204A may be configured to override the stored depth buffer value at the first pixel position with the depth value of the second object rendered at the first pixel position. Similarly, the depth buffer 204A may be configured to assign the depth buffer value at each pixel position of the plurality of pixel positions in the display area 304 of the display screen 110. For example, the depth buffer 204A may assign the first depth buffer value at the first pixel position of the first pixel 306 based on depth buffering. The first depth buffer value may be the depth value or the "Z"-coordinate value of the first vertex 308 rendered at the first pixel position of the first pixel 306. At the same pixel position, that is, the first pixel position of the first pixel 306, a depth value may be assigned to the second vertex 310 of the first 3D human body model 302. The depth value of the first vertex 308 may be less than the depth value of the second vertex 310, due to which the depth buffer 204A may override the depth value of the second vertex 310 with the depth value of the first vertex 308. Therefore, the depth buffer 204A may assign the depth value of the first vertex 308 as the first depth buffer value at a first pixel position of the first pixel 306.

The modeling circuitry 202 may be configured to detect the first vertex 308 as the visible vertex or the occluded vertex, based on a difference in the depth value of the first vertex 308 rendered at the first pixel position on the display screen 110 and the first depth value assigned for the first pixel position of the first pixel 306. The difference in the depth value of the first vertex 308 rendered at the first pixel position on the display screen 110 and the first depth buffer value assigned for the first pixel position of the first pixel 306 may be calculated, for example, by equation (1) as given below:

$$|d_n - d| \quad (1)$$

where, "$d_n$" represents the depth value of the first vertex rendered at the first pixel position on the display screen 110; and "d" represents the first depth buffer value assigned for the first pixel position of the first pixel 306.

The first vertex 308 of the plurality of vertices may be detected as the visible vertex when the difference in the depth value of the first vertex 308 rendered at the first pixel position and the first depth buffer value assigned for the first pixel position, may be less than a defined first threshold value. Alternatively, the first vertex 308 of the plurality of vertices may be detected as the occluded vertex when the difference in the depth value of the first vertex 308 rendered at the first pixel position and the first depth buffer value assigned for the first pixel position, may be greater than the defined first threshold value. For example, in some embodiments, the defined first threshold value may be "0.0001". Therefore, in such cases, if the difference in the depth value of the first vertex 308 rendered at the first pixel position and the depth buffer value assigned for the first pixel position may be less than "0.0001", then the first vertex 308 may be visible vertex. Similarly, the modeling circuitry 202 may be configured to detect the plurality of vertices of the first 3D human body model 302 as visible vertices and occluded vertices.

Figure 3C:
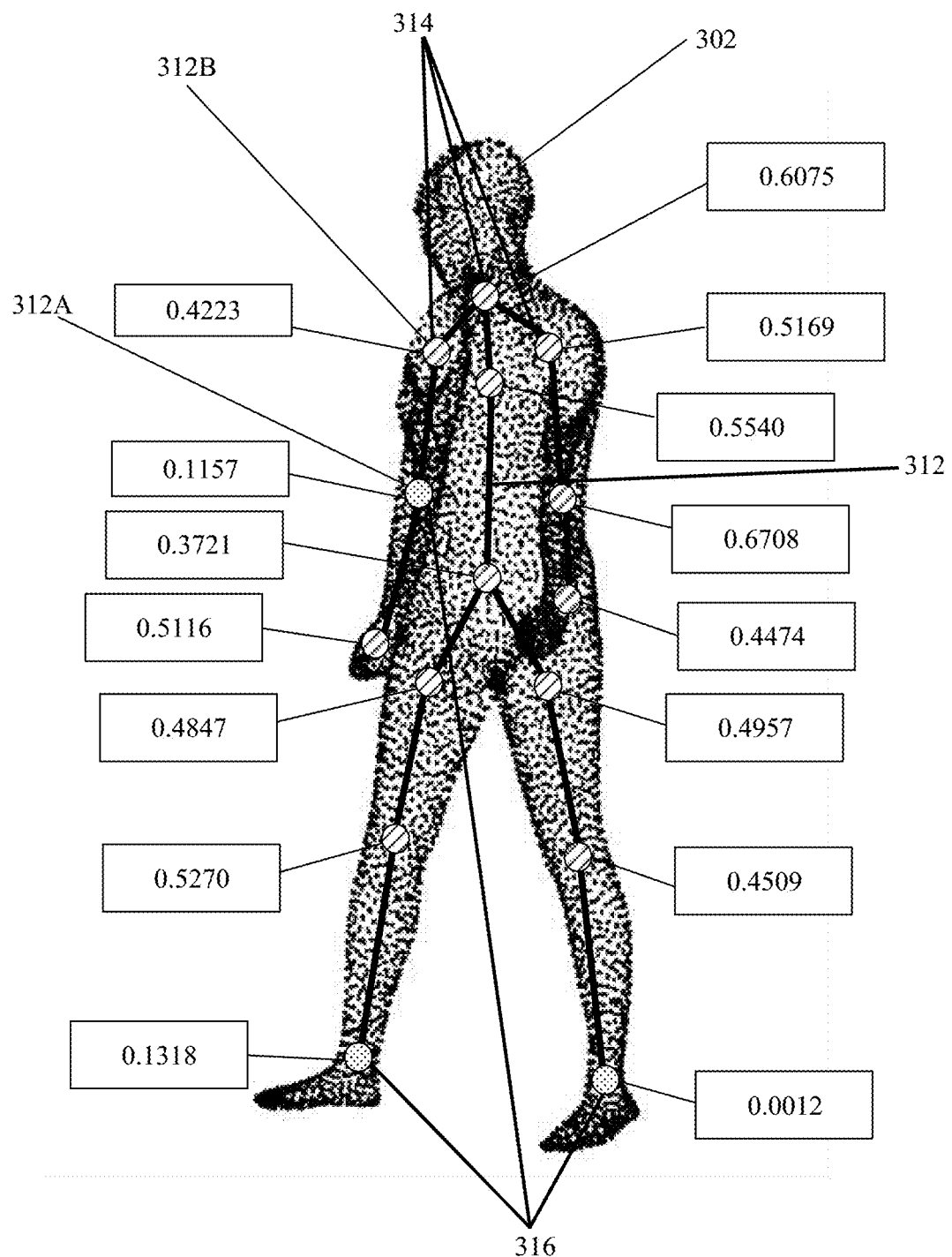

With reference to FIG. 3C, there is shown a skeleton 312 (e.g. rig) of the first 3D human body model 302, a first joint 312A, and a second joint 312B. There is further shown a set of visible joints 314 of the skeleton 312 of the first 3D human body model 302 and a set of occluded joints 316 of the skeleton 312 of the first 3D human body model 302. The skeleton 312 of the first 3D human body model 302 may correspond to a digital rig of the first 3D human body model 302. Each joint of the plurality of joints of the skeleton 312 of the first 3D human body model may be associated with a rigid rotation based on the rotation angle and the rotation axis of each joint of the plurality of joints. The first joint 312A of the skeleton 312 corresponds to one of the set of occluded joints 316. The second joint 312B corresponds to one of the set of visible joints 314. In accordance with an embodiment, the modeling circuitry 202 may be configured to determine the set of visible joints 314 and the set of occluded joints 316 from the plurality of joints of the skeleton 312 of the first 3D human body model 302 rendered on the display screen 110. The set of visible joints 314 and the set of occluded joints 316 may be determined from the plurality of joints, based on a comparison of a number of visible vertices and a number of occluded vertices controlled by each joint of the plurality of joints. Each joint of the plurality of joints may control the number of visible vertices of the set of visible vertices 302A (as shown in FIG. 3A) and the number of occluded vertices of the set of occluded vertices 302B (as shown in FIG. 3A) to represent the pose of the captured first human subject 112.

In accordance with an embodiment, the modeling circuitry 202 may be configured to calculate a visibility score of each joint of the plurality of joints in the rendered state. The visibility score of each joint may be calculated based on a comparison of at least the number of visible vertices and the number of the occluded vertices controlled by each joint of the plurality of joints of the skeleton 312 of the first 3D human body model 302. The visibility score of each joint of the plurality of joints may be calculated further based on a plurality of blend weights for the plurality of vertices of the rendered first 3D human body model 302 controlled by each joint of the plurality of joints. The visibility score of each joint of the plurality of joints of the skeleton 312 of the first 3D human body model 302 rendered on the display screen 110 may be calculated, for example, by equation (2) as given below:

$$Vis(i) = \frac{\sum_j \alpha_j w_{i,j}}{\sum_j w_{i,j}}$$

where, Vis(i) represents visibility score of a joint "i";
$w_{i,j}$ represents blend weight of a vertex "j" which is controlled by the joint "i";
$\alpha_j = 1$ if the vertex "j" is visible; and
$\alpha_j = 0$ if the vertex "j" is occluded.

Figure 3D:
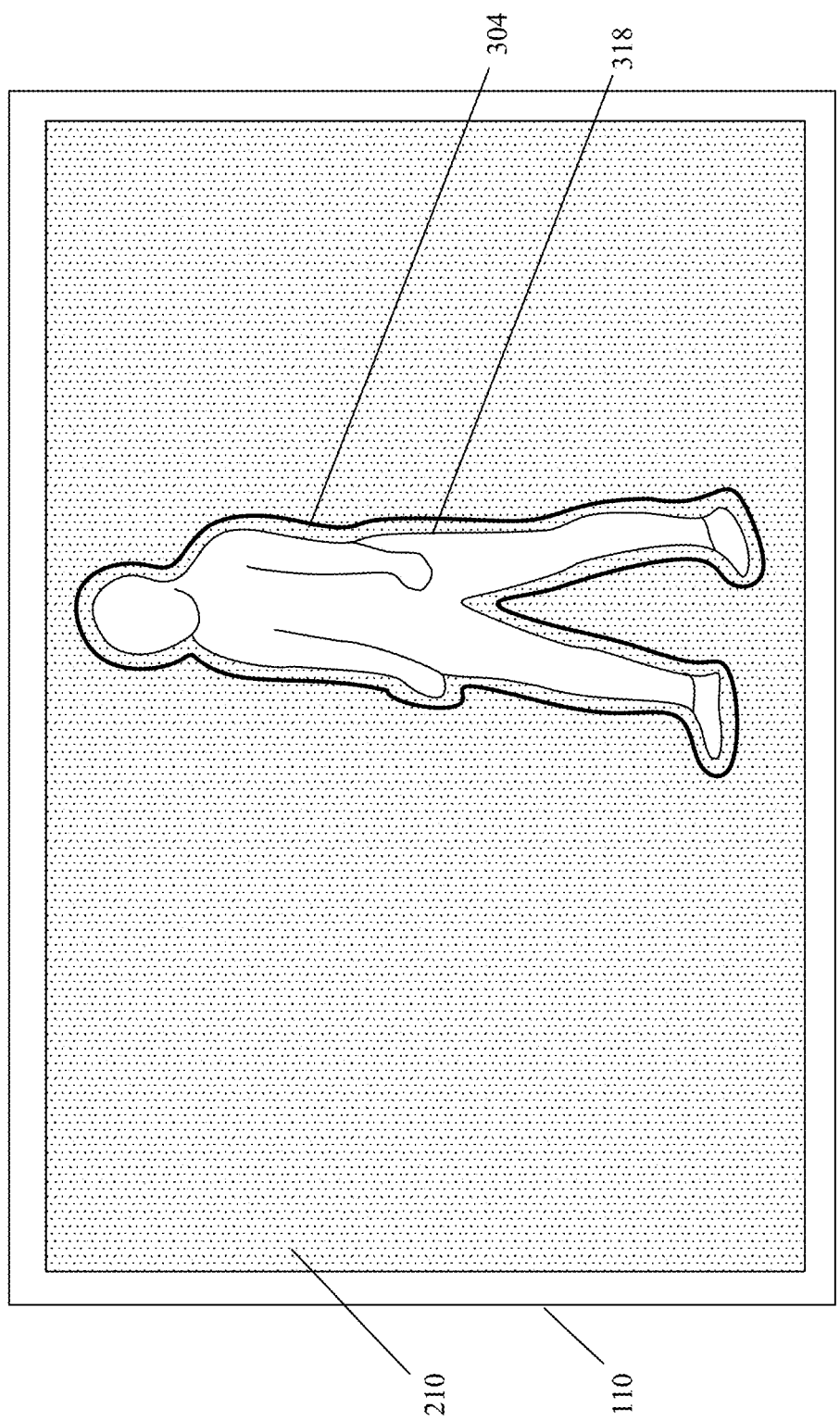

The modeling circuitry 202 may be configured to determine the set of visible joints 314 and the set of occluded joints further based on the calculated visibility score of each joint of the plurality of joints of the skeleton 312 of the first 3D human body model 302. The first joint 312A of the plurality of joints of the skeleton 312 of the first 3D human body model 302 in the rendered state may be detected as the visible joint when the visibility score of the first joint 312A is greater than a defined second threshold value. In another scenario, the first joint 312A of the plurality of joints of the skeleton 312 of the first 3D human body model 302 in the rendered state is detected as the occluded joint when the visibility score of the first joint is less than a defined second threshold value. For example, if the defined second threshold value is set as "0.25" and the visibility score of the first joint 312A is calculated as "0.1157", then the first joint 312A may be the occluded joint of the set of occluded joints 316. In another example, if the defined second threshold value is set as "0.25" and the visibility score of the second joint 312B is calculated as "0.4223", then the second joint may be the visible joint of the set of visible joints 314. FIG. 3D illustrates a plurality of visibility scores of the plurality of joints of the skeleton 312. Similarly, each joint of the plurality of joints may be determined as the visible joint or the occluded joint based on the calculated visibility score of each joint of the plurality of joints.

The modeling circuitry 202 may be configured to detect the plurality of occluded portions of the first 3D human body model 302 based on a combination of the detected set of visible vertices 302A, the detected set of occluded vertices 302B, and the determined set of occluded joints 316. In accordance with an embodiment, the modeling circuitry 202 may be configured to update the rotation angle and the rotation axis of the determined set of occluded joints 316 to a defined default value in the skeleton 312 of the first 3D human body model 302. Therefore, the rigid rotation of the set of occluded joints 316 may be updated to the defined default value. The rotation angle and the rotation axis of the determined set of visible joints 314 of the plurality of joints in the skeleton may be set based on the captured plurality of depth values by the depth sensor 106B.

With reference to FIG. 3D, there is shown a reconstructed 3D human model 318, the display area 304, the application interface 210, and the display screen 110. In accordance with an embodiment, the modeling circuitry 202 may be configured to re-render the first 3D human body model 302 (not shown in FIG. 3D) as the reconstructed 3D human model 318 of the first human subject 112 on the display screen 110. The modeling circuitry 202 may be configured to deform the first 3D human body model 302 to generate the reconstructed 3D human model 318. The modeling circuitry 202 may be configured to re-render the reconstructed 3D human model 318 in accordance with the set rotation angle and the rotation axis of the set of visible joints 314 (as shown in FIG. 3C) and the updated rotation angle and the rotation axis of the set of occluded joints 316 (as shown in FIG. 3C).

The modeling circuitry 202 may be configured to control deformation of the first 3D human body model 302 during re-render of the first 3D human body model 302 as the reconstructed 3D human model 318 of the first human subject 112 on the display screen 110. The deformation may be controlled such that the reconstructed 3D human model 318 may exhibit a minimum deviation from a current shape and a current pose of the first human subject 112 during capture of the plurality of depth values by the depth sensor 106B from the single viewpoint. The reconstructed 3D human model 318 may be a realistic 3D human body model of the first human subject 112 that may represent the current shape and the current pose of the first human subject 112. The reconstructed 3D human model 318 may not include the detected plurality of occluded portions of the first 3D human body model 302. The reconstructed 3D human model 318 may be an accurate 3D human body model of the first human subject 112 as the rigid rotation of the set of occluded joints 316, which may cause errors otherwise, are set to the defined default value. The reconstructed 3D human model 318 of the first human subject 112 may represent a visible surface of the first 3D human body model 302 that may comprise the set of visible vertices 302A and the set of visible joints 314. The reconstructed 3D human model 318 of the first human subject 112 may represent the accurate shape and pose of the first human subject 112 and may be unaffected by the detected plurality of occluded portions of the first 3D human body model 302 of the first human subject 112.

Figure 4A:
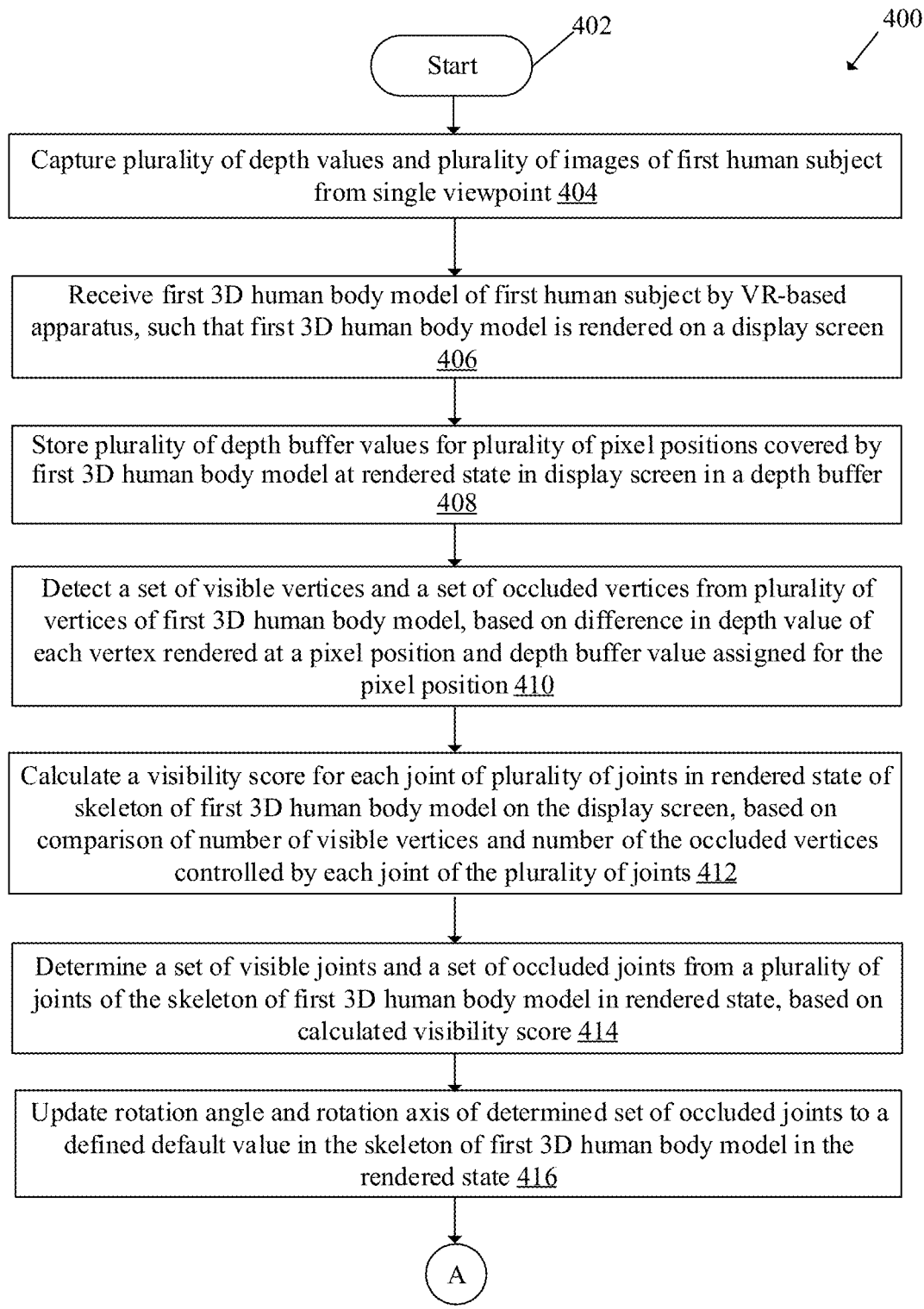
FIGS. 4A and 4B, collectively, depict a flowchart that illustrates exemplary operations for reconstruction and detection of occluded portions of 3D human body model using depth data from single viewpoint, in accordance with an embodiment of the disclosure.
Figure 4B:
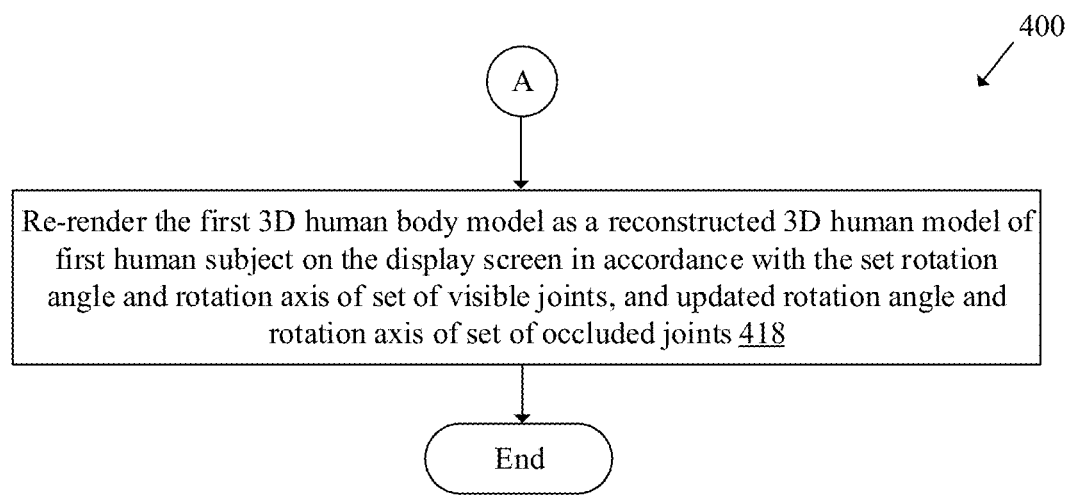

FIGS. 4A and 4B collectively, depict a flowchart that illustrates exemplary operations for reconstruction and detection of occluded portions of 3D human body model using depth data from single viewpoint, in accordance with and embodiment of the disclosure. With reference to FIGS. 4A and 4B, there is shown a flowchart 400. The flowchart 400 is described in conjunction with FIGS. 1, 2, 3A, 3B, 3C and 3D. The operations from 404 to 418 may be implemented in the VR-based apparatus 102. The operations of the flowchart 400 may start at 402 and proceed to 404.

At 404, a plurality of depth values and a plurality of images of the first human subject 112 may be captured from a single viewpoint. The sensing device 106 may comprise the depth sensor 106B configured to capture the plurality of depth values of the first human subject 112 from the single viewpoint. The image sensor 106A may be configured to capture the plurality of images of the first human subject 112 from the single viewpoint. The captured plurality of depth values may include values of "Z" coordinates of the first human subject 112 in a 3D coordinate system from the single viewpoint.

At 406, the first 3D human body model 302 of the first human subject 112 may be received by the VR-based apparatus 102 such that the received first 3D human body model 302 may be rendered on the display screen 110. The VR-based apparatus 102 may be configured to store the first 3D human body model 302 of the first human subject 112 and structural information of a skeleton comprising the plurality of joints of the first 3D human body model 302.

At 408, a plurality of depth buffer values for a plurality of pixel positions covered by the first 3D human body model at the rendered state in the display screen 110, may be stored in a depth buffer 204A. The memory device 204 may include the depth buffer 204A configured to store a depth buffer value for each pixel position of the plurality of pixel positions covered by the first 3D human body model 302 in the display screen 110. The depth buffer 204A may be configured to assign the depth buffer value at each pixel position of the plurality of pixel positions in the display area 304 of the first 3D human body model 302 on the display screen 110, based on depth buffering. The depth buffering utilized for assigning of the depth buffer value at each pixel position is shown and described, for example, in FIG. 3B.

At 410, the set of visible vertices 302A and the set of occluded vertices 302B from the plurality of vertices of the first 3D human body model 302 may be detected based on a difference in a depth value of each vertex rendered at a pixel position and a depth buffer value assigned for the pixel position. The modeling circuitry 202 may be configured to detect the set of visible vertices 302A and the set of occluded vertices 302B from the plurality of vertices of the first 3D human body model 302 rendered on the display screen 110. For example, the first vertex of the plurality of vertices may be detected as a visible vertex or an occluded vertex, based on the difference in the depth value of the first vertex rendered at the first pixel position on the display screen 110 and the depth buffer value assigned for the first pixel position. The first vertex (for e.g. the first vertex 308 as shown in FIG. 3B) of the plurality of vertices may be detected as the visible vertex when the difference in the depth value of the first vertex rendered at the first pixel position on the display screen 110 and the depth buffer value assigned for the first pixel position, may be less than a defined first threshold value. Alternatively, the first vertex (for e.g. the first vertex 308 as shown in FIG. 3B) of the plurality of vertices may be detected as the occluded vertex when the difference in the depth value of the first vertex (for e.g. the first vertex 308 as shown in FIG. 3B) rendered at the first pixel position on the display screen 110 and the depth buffer value assigned for the first pixel position, may be greater than the defined first threshold value. The detection of the set of visible vertices and the set of occluded vertices is shown and described, for example, in FIG. 3B.

At 412, a visibility score may be calculated for each joint of the plurality of joints in the rendered state of the skeleton (e.g. rig) of the first 3D human body model 302 on the display screen 110. The modeling circuitry 202 may be configured to calculate the visibility score of each joint based on a comparison of the number of visible vertices and the number of the occluded vertices controlled by each joint of the plurality of joints of the skeleton 312 of the first 3D human body model 302. The visibility score of each joint of the plurality of joints may be calculated further, based on a plurality of blend weights for the plurality of vertices of the rendered first 3D human body model. Each blend weight of the plurality of blend weights may indicate an extent of deformation that is to be exerted on each vertex of the plurality of vertices of the rendered first 3D human body model 302 to represent a pose of the first human subject 112. The calculation of the visibility score of each joint of the plurality of joints is shown, for example, in FIG. 3C.

At 414, the set of visible joints 314 and the set of occluded joints 316 from a plurality of joints of the skeleton 312 of the first 3D human body model 302 in the rendered state, may be determined. The modeling circuitry 202 may be configured to detect the set of visible joints 314 and the set of occluded joints 316 based on at least a comparison of the number of visible vertices and the number of occluded vertices, controlled by each joint. The set of visible joints 314 and the set of occluded joints 316 from the plurality of joints of the first 3D human body model 302 in the rendered state may be determined further based on the calculated visibility score of each joint of the plurality of joints in the rendered state. The first joint of the plurality of joints of the first 3D human body model 302 in the rendered state may be determined as the visible joint when the visibility score of the first joint may be greater than a defined second threshold value. Alternatively, the first joint of the plurality of joints of the first 3D human body model in the rendered state may be determined as the occluded joint when the visibility score of the first joint may be less than the defined second threshold value. The determination of the set of visible joints 314 and the set of occluded joints 316 is shown and described, for example, in FIG. 3C.

At 416, the rotation angle and the rotation axis of the determined set of occluded joints 316 may be updated to a defined default value in the skeleton 312 of the first 3D human body model 302 in the rendered state. The modeling circuitry 202 may be configured to update the rotation angle and the rotation axis of the determined set of occluded joints 316 to the defined default value. The rotation angle and the rotation axis of the determined set of visible joints 314 of the plurality of joints in the skeleton 312 may be set based on the captured plurality of depth values of the first human subject 112 by the depth sensor 106B. The update of the rotation angle and the rotation axis of the determined set of occluded joints 316 to the defined default value is shown and described, for example, in FIG. 3C.

At 418, the first 3D human body model 302 may be re-rendered as a reconstructed 3D human model of the first human subject 112 on the display screen 110. The modeling circuitry 202 may be configured to re-render the first 3D human body model 302 as the reconstructed 3D human model 318 in accordance with the set rotation angle and the rotation axis of the set of visible joints, and the updated rotation angle and the rotation axis of the set of occluded joints. The modeling circuitry 202 may be further configured to control deformation of the first 3D human body model 302 during re-render of the first 3D human body model 302 as the reconstructed 3D human model 318 of the first human subject 112 on the display screen 110. The reconstructed 3D human model may exhibit minimum deviation from the current shape and the current pose of the first human subject 112 during capture of the plurality of depth values by the depth sensor 106B from the single viewpoint. The re-rendering of the first 3D human body model 302 as the reconstructed 3D human model is shown and describes, for example, in FIG. 3D. The control may pass to end.

Exemplary aspects of the disclosure may include a VR-based apparatus (such as the VR-based apparatus 102) that includes a depth sensor (such as the depth sensor 106B) configured to capture a plurality of depth values of a first human subject (such as the first human subject 112) from a single viewpoint. The VR-based apparatus may further include a modeling circuitry (such as the modeling circuitry 202) configured to detect, at a rendered state of a first 3D human body model (such as the first 3D human body model 302) of the first human subject on a display screen (such as the display screen 110), a set of visible vertices and a set of occluded vertices from a plurality of vertices of the first 3D human body model. At least a first vertex of the plurality of vertices may be detected as a visible vertex or an occluded vertex, based on a difference in a depth value of the first vertex rendered at a first pixel position on the display screen and a depth buffer value assigned for the first pixel position. The modeling circuitry may be further configured to determine, at the rendered state of the first 3D human body model, a set of occluded joints and a set of visible joints from a plurality of joints of a skeleton of the first 3D human body model. At least a first joint of the plurality of joints may be detected as a visible joint or an occluded joint based on at least a comparison of a number of visible vertices and a number of occluded vertices, controlled by the first joint. The modeling circuitry may be configured to update a rotation angle and a rotation axis of the determined set of occluded joints to a defined default value in the skeleton of the first 3D human body model. The rotation angle and the rotation axis of the determined set of visible joints of the plurality of joints in the skeleton may be set based on the captured plurality of depth values by the depth sensor. The modeling circuitry may be configured to re-render the first 3D human body model as a reconstructed 3D human model of the first human subject on the display screen. The first 3D human body model may be re-rendered in accordance with the set rotation angle and the rotation axis of the set of visible joints and the updated rotation angle and the rotation axis of the set of occluded joints.

In accordance with an embodiment, the modeling circuitry may be further configured to learn a reference 3D human body model from a training dataset that may comprise a plurality of representative human body models of different shapes. The first 3D human body model may be a deformed 3D human model that may be deformed using a plurality of pose parameters and a plurality of shape parameters, associated with the first human subject, on the reference 3D human model. The VR-based apparatus may comprise a memory device configured to store the first 3D human body model of the first human subject and structural information of a skeleton comprising the plurality of joints of the first 3D human body model. The VR-based apparatus may further comprise a depth buffer in the memory device configured to store a plurality of depth buffer values. The plurality of depth buffer values may include the depth buffer value for each pixel position of a plurality of pixel positions covered by the first 3D human body model at the rendered state in the display screen. Each joint of the plurality of joints in the structural information of the skeleton may be associated with a rigid rotation based on the rotation angle and the rotation axis of each joint of the plurality of joints.

In accordance with an embodiment, the first vertex of the plurality of vertices may be detected as the visible vertex when the difference in the depth value of the first vertex rendered at the first pixel position on the display screen and the depth buffer value assigned for the first pixel position, is less than a defined first threshold value. Additionally, the first vertex of the plurality of vertices may be detected as the occluded vertex when the difference in the depth value of the first vertex rendered at the first pixel position on the display screen and the depth buffer value assigned for the first pixel position, may be greater than a defined first threshold value.

In accordance with an embodiment, the modeling circuitry may be configured to calculate a visibility score of each joint of the plurality of joints in the rendered state. The visibility score may be calculated based on a comparison of at least the number of visible vertices and the number of the occluded vertices controlled by each joint of the plurality of joints of the skeleton of the first 3D human body model. The visibility score of each joint of the plurality of joints may be calculated further based on a plurality of blend weights for the plurality of vertices of the rendered first 3D human body model. Each blend weight may indicate an extent of deformation that is to be exerted on each vertex of the plurality of vertices of the rendered first 3D human body model to represent a pose of the first human subject.

In accordance with an embodiment, the set of occluded joints and the set of visible joints from the plurality of joints in the rendered state may be further determined based on the calculated visibility score of each joint of the plurality of joints in the rendered state. The first joint of the plurality of joints in the rendered state may be detected as the visible joint when a visibility score of the first joint may be greater than a defined second threshold value. Alternatively, the first joint of the plurality of joints in the rendered state may be detected as the occluded joint when a visibility score of the first joint may be less than the defined second threshold value. The modeling circuitry may be configured to detect a plurality of occluded portions of the first 3D human body model based on a combination of the detected set of visible vertices, the detected set of occluded vertices, and the determined set of occluded joints. The modeling circuitry may be further configured to control deformation of the first 3D human body model during re-render of the first 3D human body model as the reconstructed 3D human model of the first human subject on the display screen. The deformation may be controlled such that the reconstructed 3D human model exhibits a minimum deviation from a current shape and a current pose of the first human subject during capture of the plurality of depth values by the depth sensor from the single viewpoint.

Various embodiments of the disclosure may provide a non-transitory, computer-readable medium and/or storage medium, and/or a non-transitory machine readable medium and/or storage medium stored thereon, a set of instructions executable by a machine and/or a computer that comprises one or more circuits communicatively coupled to a sensing device. The set of instructions may be executable by the machine and/or the computer to perform the steps that may comprise capture of a plurality of depth values of a first human subject from a single viewpoint. A set of visible vertices and a set of occluded vertices may be detected from a plurality of vertices of a first 3D human body model at a rendered state of the first 3D human body model of the first human subject on a display screen. At least a first vertex of the plurality of vertices may be detected as a visible vertex or an occluded vertex based on a difference in a depth value of the first vertex rendered at a first pixel position on the display screen and a depth buffer value assigned for the first pixel position. A set of occluded joints and a set of visible joints may be determined from a plurality of joints of a skeleton of the first 3D human body model in the rendered state. At least a first joint of the plurality of joints may be detected as a visible joint or an occluded joint based on at least a comparison of a number of visible vertices and a number of occluded vertices, controlled by the first joint. A rotation angle and a rotation axis of the determined set of occluded joints may be updated to a defined default value in the skeleton of the first 3D human body model. The rotation angle and the rotation axis of the determined set of visible joints of the plurality of joints in the skeleton may be set based on the captured plurality of depth values by the depth sensor. The first 3D human body model may be re-rendered as a reconstructed 3D human model of the first human subject on the display screen. The first 3D human body model may be re-rendered in accordance with the set rotation angle and the rotation axis of the set of visible joints and the updated rotation angle and the rotation axis of the set of occluded joints.

In accordance with an exemplary aspect of the disclosure, the VR-based apparatus 102 may be an augmented-reality based device or head mounted device. Thus, the operations executed by the VR-based apparatus 102 as described in the present disclosure, may also be executed augmented-reality based device. For example, the virtual-reality based device may present a human body model, such as the reconstructed 3D human model 318, of a first human, such as the first human subject 112 to a second device in a remote communication. The reconstructed 3D human model 318 of the first human subject 112 may mimic the body of the first human subject 112 in a plurality of poses in real time or near-real time. The reconstructed 3D human model 318 of the first human subject 112 may also be textured with image data to resemble the first human subject 112. Thus, the display of the reconstructed 3D human model 318 by the virtual-reality based device creates a virtual telepresence of the first human, such as the first human subject 112, in a remote location, for a user associated with the second device.

In accordance with another exemplary aspect of the disclosure, the VR-based apparatus 102 may be a gaming device. Thus, the operations executed by the VR-based apparatus 102 as described in the present disclosure, may also be executed by the gaming device. For example, the gaming device may present a gaming character, such as the reconstructed 3D human model 318 of the first human subject 112, in a gaming environment to a player. The gaming device may further cause the gaming character to imitate one or more poses of the player. This may enable the player to control movement of the gaming character in the gaming environment. For example, in the event the player starts to move his head, the gaming character may imitate the moving head of the player and other body parts without any visible artifacts due to occlusion. The gaming environment may also be a multiplayer game. In such a case, the gaming device may present a plurality of gaming characters, each imitating one of the multiple players in the multiplayer game.

In accordance with yet another exemplary aspect of the disclosure, the VR-based apparatus 102 may be a 3D model-based conferencing system. Thus, the operations executed by the VR-based apparatus 102 as described in the present disclosure, may also be executed by the 3D model-based conferencing system. Usually, the conventional video conferencing systems require a high network bandwidth for a seamless transmission of video. In an event that the requirement of network bandwidth is not fulfilled, video conferencing is hindered. The 3D model based conferencing device, such as the VR-based apparatus 102, enables a conferencing platform, where communication between multiple users occur using 3D models that mimics a pose and a shape of body of the multiple users, while exchanging information through the VR-based apparatus 102. Therefore, the conferencing platform may not require an upload or a download of video, or execute live video sharing (as done conventionally), and thereby, may not require high network bandwidth for video transmission. For example, the 3D model based conferencing device may track one or more poses of a first person involved in conferencing. The 3D model based conferencing device may then animate a human 3D model, such as the reconstructed 3D human model 318 of the first human subject 112 without any visible artifacts due to model's body portion occlusion, based on the tracked one or more poses and shape of the first person, such as the first human subject 112. The animated 3D model may be presented along with recorded audio of the first person to a second person involved in the conferencing. The 3D model based conferencing device may further present another animated 3D model to the first person that imitates one or more poses and shape of the second person. Thus, the 3D model based conferencing device enables the first person and the second person to participate in conferencing with enhanced viewing experience.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A virtual reality (VR)-based apparatus, comprising:
a depth sensor configured to capture a plurality of depth values of a human subject from a single viewpoint;
a modeling circuitry configured to:
detect, at a rendered state of a three dimensional (3D) human body model of the human subject on a display screen, a set of visible vertices and a set of occluded vertices from a plurality of vertices of the 3D human body model,
wherein at least one vertex of the plurality of vertices is detected as one of a visible vertex of the set of visible vertices or an occluded vertex of the set of occluded vertices based on a difference in a depth value of the at least one vertex rendered at a specific pixel position on the display screen and a depth buffer value assigned for the specific pixel position;
determine, at the rendered state of the 3D human body model, a set of occluded joints and a set of visible joints from a plurality of joints of a skeleton of the 3D human body model in the rendered state,
wherein at least one joint of the plurality of joints is determined as one of a visible joint of the set of visible joints or an occluded joint of the set of occluded joints based on at least a comparison of a first number of visible vertices of the set of visible vertices controlled by the at least one joint and a first number of occluded vertices of the set of occluded vertices controlled by the at least one joint;
update a rotation angle and a rotation axis of the determined set of occluded joints to a default value in the skeleton of the 3D human body model;
set a rotation angle and a rotation axis of the determined set of visible joints of the plurality of joints in the skeleton based on the captured plurality of depth values by the depth sensor; and
re-render the 3D human body model as a reconstructed 3D human model of the human subject on the display screen,
wherein the re-render of the 3D human body model is based on the set rotation angle and the rotation axis of the set of visible joints, and the updated rotation angle and the rotation axis of the set of occluded joints.

2. The VR-based apparatus according to claim 1, wherein the modeling circuitry is further configured to:
learn a reference 3D human body model from a training dataset that comprises a plurality of representative human body models of different shapes; and
generate the 3D human body model based on deformation of a mean body shape of the reference 3D human body model,
the deformation is based on a plurality of pose parameters and a plurality of shape parameters, and
the plurality of pose parameters and the plurality of shape parameters are associated with the human subject.

3. The VR-based apparatus according to claim 1, further comprising a memory device configured to store the 3D human body model of the human subject and structural information of the skeleton comprising the plurality of joints of the 3D human body model.

4. The VR-based apparatus according to claim 3, further comprising a depth buffer in the memory device, wherein the depth buffer is configured to store a plurality of depth buffer values that includes the depth buffer value for each pixel position of a plurality of pixel positions covered by the 3D human body model at the rendered state in the display screen.

5. The VR-based apparatus according to claim 3, wherein each joint of the plurality of joints in the structural information of the skeleton is associated with a rigid rotation based on the rotation angle and the rotation axis of each joint of the plurality of joints.

6. The VR-based apparatus according to claim 1, wherein the difference in the depth value of the at least one vertex rendered at the specific pixel position on the display screen and the depth buffer value assigned for the specific pixel position is less than a first threshold value.

7. The VR-based apparatus according to claim 1, wherein the difference in the depth value of the at least one vertex rendered at the specific pixel position on the display screen and the depth buffer value assigned for the specific pixel position is greater than a first threshold value.

8. The VR-based apparatus according to claim 1, wherein the modeling circuitry is further configured to calculate a visibility score of each joint of the plurality of joints in the rendered state, based on a comparison of at least a second number of visible vertices controlled by each joint of the plurality of joints and a second number of occluded vertices controlled by each joint of the plurality of joints.

9. The VR-based apparatus according to claim 8, wherein the visibility score of each joint of the plurality of joints is calculated further based on a plurality of blend weights for the plurality of vertices of the rendered 3D human body model, and
each blend weight of the plurality of blend weights indicates an extent of deformation that is to be exerted on each vertex of the plurality of vertices of the rendered 3D human body model to represent a pose of the human subject.

10. The VR-based apparatus according to claim 9, wherein the determination of the set of occluded joints and the set of visible joints from the plurality of joints in the rendered state is further based on the calculated visibility score of each joint of the plurality of joints in the rendered state.

11. The VR-based apparatus according to claim 1, wherein the at least one joint of the plurality of joints in the rendered state is determined as the visible joint based on a visibility score of the at least one joint that is greater than a second threshold value.

12. The VR-based apparatus according to claim 1, wherein the at least one joint of the plurality of joints in the rendered state is determined as the occluded joint based on a visibility score of the at least one joint that is less than a second threshold value.

13. The VR-based apparatus according to claim 1, wherein the modeling circuitry is further configured to detect a plurality of occluded portions of the 3D human body model based on a combination of the detected set of visible vertices, the detected set of occluded vertices, and the determined set of occluded joints.

14. The VR-based apparatus according to claim 1, wherein
the modeling circuitry is further configured to control deformation of the 3D human body model during the re-render of the 3D human body model such that the reconstructed 3D human model exhibits a minimum deviation from a current shape and a current pose of the human subject during the capture of the plurality of depth values by the depth sensor from the single viewpoint.

15. A method, comprising:
in a virtual reality (VR)-based apparatus comprising a depth sensor and a modeling circuitry:
detecting, by the modeling circuitry, at a rendered state of a three dimensional (3D) human body model of a human subject on a display screen, a set of visible vertices and a set of occluded vertices from a plurality of vertices of the 3D human body model,
wherein at least one vertex of the plurality of vertices is detected as one of a visible vertex of the set of visible vertices or an occluded vertex of the set of occluded vertices based on a difference in a depth value of the at least one vertex rendered at a specific pixel position on the display screen and a depth buffer value assigned for the specific pixel position;
determining, by the modeling circuitry, at the rendered state of the 3D human body model, a set of occluded joints and a set of visible joints from a plurality of joints of a skeleton of the 3D human body model in the rendered state,
wherein at least one joint of the plurality of joints is determined as one of a visible joint of the set of visible joints or an occluded joint of the set of occluded joints based on at least a comparison of a number of visible vertices of the set of visible vertices controlled by the at least one joint and a number of occluded vertices of the set of occluded vertices controlled by the at least one joint;
updating, by the modeling circuitry, a rotation angle and a rotation axis of the determined set of occluded joints to a default value in the skeleton of the 3D human body model;
setting, by the modeling circuitry, a rotation angle and a rotation axis of the determined set of visible joints of the plurality of joints in the skeleton based on a plurality of depth values captured by the depth sensor; and
re-rendering, by the modeling circuitry, the 3D human body model as a reconstructed 3D human model of the human subject on the display screen,
wherein the re-render of the 3D human body model is based on the set rotation angle and the rotation axis of the set of visible joints, and the updated rotation angle and the rotation axis of the set of occluded joints.

16. The method according to claim 15, further comprising:
learning, by the modeling circuitry, a reference 3D human body model from a training dataset that comprises a plurality of representative human body models of different shapes; and
generating, by the modeling circuitry, the 3D human body model based on deformation of a mean body shape of the reference 3D human body model, wherein
the deformation is based on a plurality of pose parameters and a plurality of shape parameters, and
the plurality of pose parameters and the plurality of shape parameters are associated with the human subject.

17. The method according to claim 15, further comprising, storing, in a memory device, the 3D human body model of the human subject and structural information of the skeleton comprising the plurality of joints of the 3D human body model.

18. The method according to claim 17, further comprising storing, in a depth buffer in the memory device, a plurality of depth buffer values that includes the depth buffer value for each pixel position of a plurality of pixel positions covered by the 3D human body model at the rendered state in the display screen.

19. The method according to claim 17, wherein each joint of the plurality of joints in the structural information of the skeleton is associated with a rigid rotation based on the rotation angle and the rotation axis of each joint of the plurality of joints.

20. The method according to claim 15, wherein the difference in the depth value of the at least one vertex rendered at the specific pixel position on the display screen and the depth buffer value assigned for the specific pixel position is less than a threshold value.

* * * * *